March 6, 1934.  J. H. DORAN  1,949,678
ELASTIC FLUID TURBINE
Filed Sept. 15, 1931
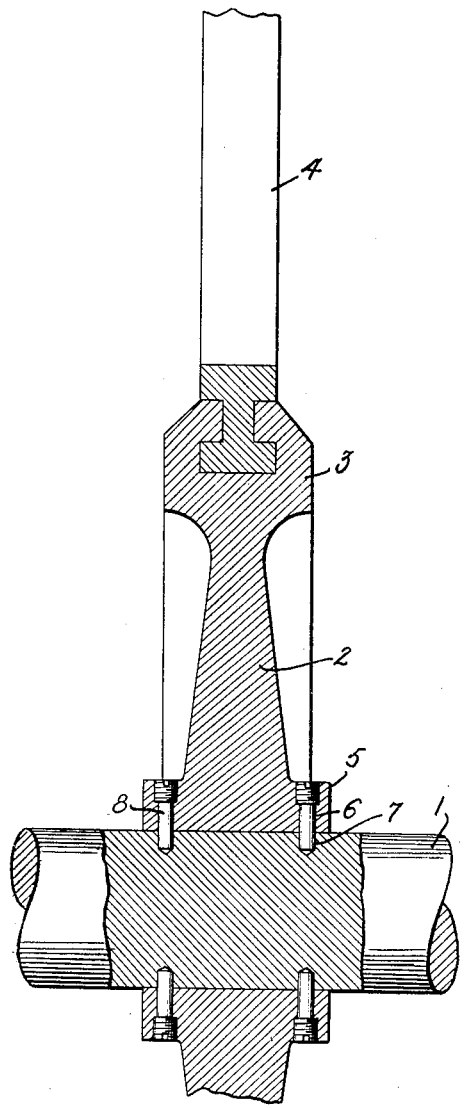
Inventor:
John H. Doran,
by Charles A. Tullar
His Attorney.

Patented Mar. 6, 1934

1,949,678

UNITED STATES PATENT OFFICE 1,949,678

ELASTIC FLUID TURBINE

John H. Doran, Scotia, N. Y., assignor to General Electric Company, a corporation of New York Application September 15, 1931, Serial No. 562,972

2 Claims. (Cl. 253—39)

The present invention relates to elastic-fluid turbines and like apparatus of which certain parts fastened to a rotary shaft are subjected to high temperature changes.

In elastic-fluid turbines, for instance, a plurality of blade or bucket carrying disks are fastened to a shaft. Provided between the individual disks are nozzle carrying diaphragms for properly directing the elastic fluid to the blades of the disks or wheels. The available energy of the elastic fluid is thereby transformed into mechanical power which is transmitted from the bucket wheels to the turbine shaft. In order to permit the transmission of power from the bucket wheels to the shaft and to prevent relative rotative movement between the individual bucket wheels it is important that the latter are securely fastened to the shaft.

Owing to the fact that the wheels are made comparatively light and are in direct contact with the elastic fluid, whereas the shaft in modern high power turbines is of considerable diameter, a more rapid heating of the wheels than that of the shaft takes place during the starting period of a turbine. This causes a relative expansion between the shaft and the wheels, and a rotative displacement of the wheels on the shaft would occur unless means are provided for preventing this rotative displacement and at the same time allowing relative expansion between the shaft and the disks. The latter is necessary in order to avoid excessive strains and stresses in the disks.

If a turbine is shut off the opposite effect during the cooling period takes place as it will be understood that the light masses of the wheels having a large surface cool more rapidly than the heavy massive shaft.

The object of the present invention is an improved construction for fastening such wheels to a rotary shaft.

For a consideration of what I believe to be novel and my invention, attention is directed to the following description and claims appended thereto, and the accompanying drawing forming a part of the specification.

In the drawing I have shown by way of example, partly in cross-section, partly broken away, a turbine shaft and a bucket wheel fastened thereto embodying my invention. It will be readily understood that my invention is not limited to turbines, but may be used with advantage in any case where a rotary member is fastened to a shaft and subjected to changes in temperature.

Reference to the drawing, 1 designates a rotary shaft of an elastic-fluid turbine; 2 is a wheel or disk surrounding the shaft and having a rim 3 to which the blades or buckets 4 are fastened by any suitable means, in the present instance shown as a dovetail connection.

According to my invention I provide the wheel with a hub 5 having a plurality of holes 6 provided in alignment with corresponding holes 7 in the shaft. Inserted in holes 6 and extending into holes 7 are dowel pins 8 having their outer ends somewhat larger in diameter than their inner ends and screw-threaded to form a tight fit with the outer screw-threaded parts of holes 6. The inner ends of said pins engage slidably the walls forming the corresponding holes 7 in the shaft. In assembling, the wheel is slid over the shaft until the holes in the latter register with the holes of the hub. The hub may be heated before assembling to form a shrink fit with the shaft, although such a fit is not necessary. Thereafter the pins 8 are inserted into holes 5 and 6 and securely fastened in holes 6.

In operation, particularly during the starting period, the disks may expand in a radial direction relatively to the shaft. They are prevented from changing their relative rotative positions by the pins which slidably engage the holes 7 in the shaft, that is, move in and outwardly therein when the wheels expand more than the shaft. During cooling of the turbine, a more rapid cooling of the hub than of the shaft takes place as mentioned above. This causes stresses in the hub, particularly when the latter is shrunk on to the shaft. As, according to my invention, a shrinking fit of the hub is not necessary, said stresses in the hub can be substantially eliminated by providing a loose fit between the hub and the shaft, which permits a comparatively light construction of the hub members.

Any suitable number of dowel pins 8 may be provided on each side of the wheel. Ordinarily at least three on each side spaced 120° apart should be provided although preferably I utilize more than three on each side.

By my invention I have accomplished a construction for fastening a disk to a shaft which is simple, light, and cheap, and not affected materially by relative expansion between the disk and the shaft.

What I claim as new and desire to secure by Letters Patent of the United States is:—

1. In an elastic fluid turbine, a rotary shaft, a disk subject to high temperature changes having a hub portion on each side integrally united with the disk, at least three circumferentially spaced radial holes in each hub portion registering with holes in the shaft and dowel pins fastened in the holes of the hub portions and having a sliding fit in the holes of the shaft for preventing non-uniformity of radial relative expansion between the shaft and the disk and maintaining driving connection between the shaft and the disk.

2. In combination, an elastic fluid turbine shaft having a plurality of holes spaced circumferentially around the shaft, a bucket wheel subject to high temperature changes having a hub with holes therein shrunk on the shaft, with the holes of the hub and the shaft in alignment, and dowel pins fastened in the holes of the hub and extending into the holes of the shaft with a sliding fit to permit the hub together with the wheel to expand radially outward with relation to the shaft without thereby causing stresses being set up in these parts and maintaining a driving connection.

JOHN H. DORAN.